(No Model.) 7 Sheets—Sheet 1.

T. CLARKSON.
CENTRIFUGAL CONCENTRATOR FOR MINERALS, &c.

No. 459,267. Patented Sept. 8, 1891.

(No Model.)  7 Sheets—Sheet 2.

T. CLARKSON.
CENTRIFUGAL CONCENTRATOR FOR MINERALS, &c.

No. 459,267.  Patented Sept. 8, 1891.

(No Model.) 7 Sheets—Sheet 3.

T. CLARKSON.
CENTRIFUGAL CONCENTRATOR FOR MINERALS, &c.

No. 459,267. Patented Sept. 8, 1891.

Witnesses:—
J. A. Rutherford.
Robert Everett.

Inventor:
Thomas Clarkson
By James L. Norris.
Attorney (No Model.)
T. CLARKSON.
CENTRIFUGAL CONCENTRATOR FOR MINERALS, &c.
No. 459,267. Patented Sept. 8, 1891.
7 Sheets—Sheet 4.
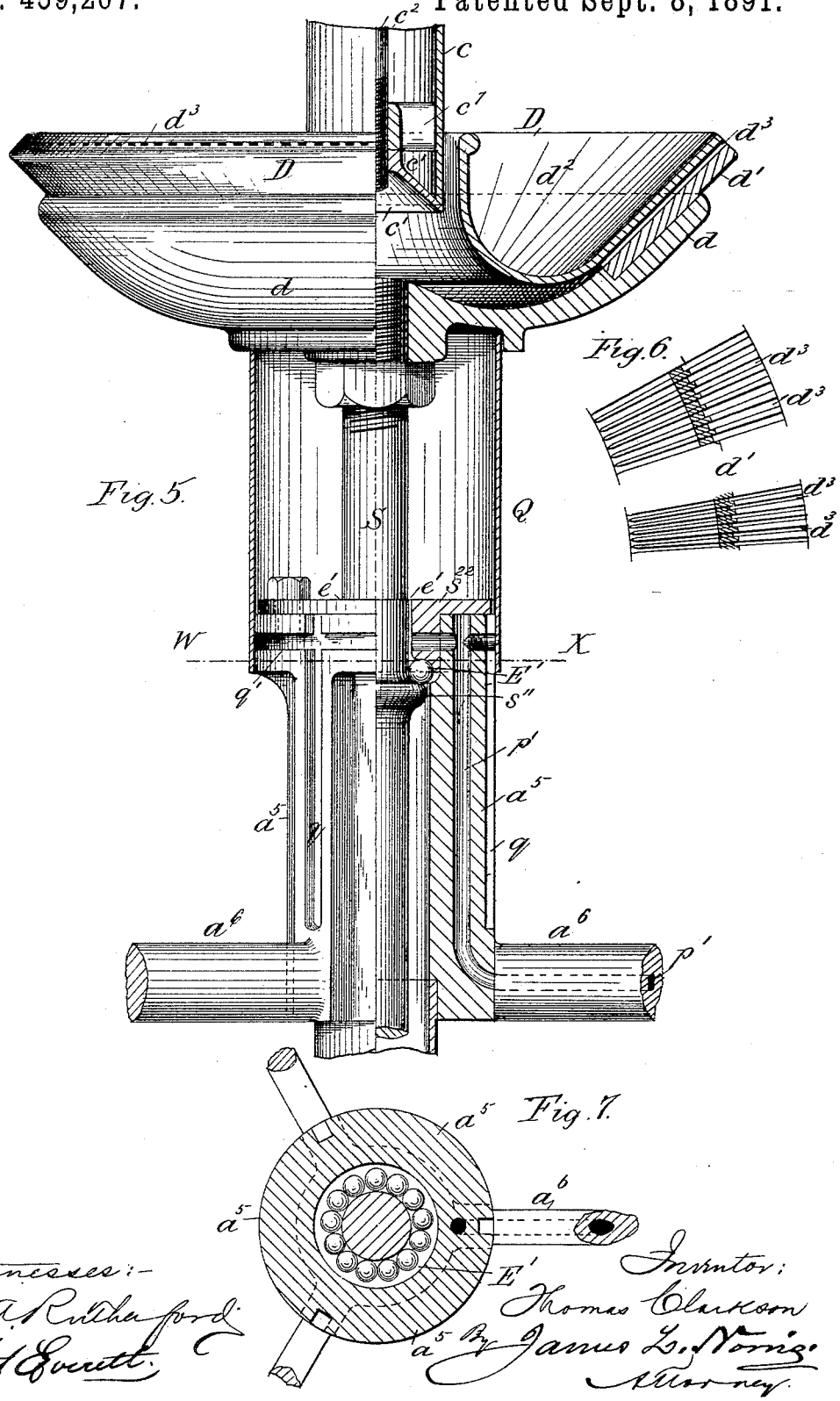

(No Model.) 7 Sheets—Sheet 6.

T. CLARKSON.
CENTRIFUGAL CONCENTRATOR FOR MINERALS, &c.

No. 459,267. Patented Sept. 8, 1891.

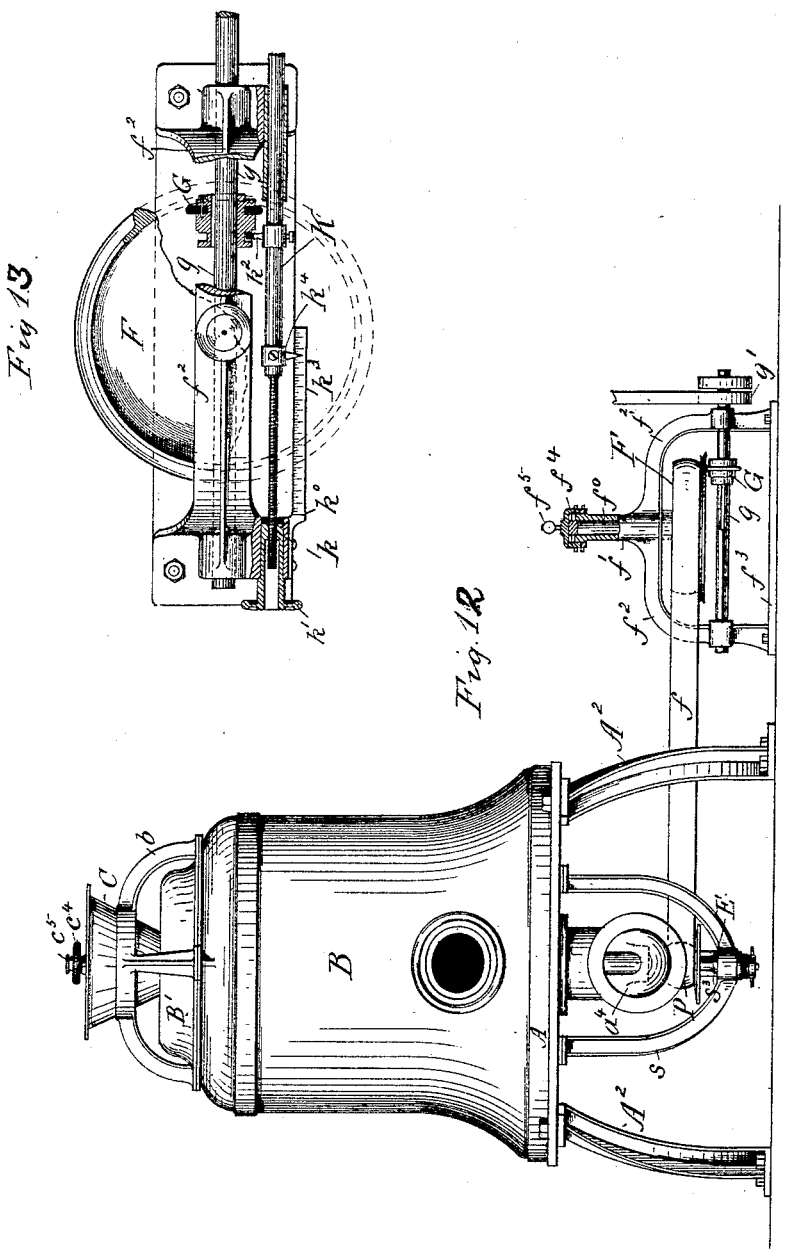

UNITED STATES PATENT OFFICE.

THOMAS CLARKSON, OF LONDON, ENGLAND, ASSIGNOR TO THE CLARKSON-STANFIELD CONCENTRATOR, LIMITED, OF SAME PLACE.

CENTRIFUGAL CONCENTRATOR FOR MINERALS, &c.

SPECIFICATION forming part of Letters Patent No. 459,267, dated September 8, 1891.

Application filed January 31, 1891. Serial No. 379,795. (No model.)

*To all whom it may concern:*

Be it known that I, THOMAS CLARKSON, a subject of the Queen of Great Britain, residing at Elm Tree Villa, Battersea, London, in the county of Surrey, England, have invented certain new and useful Improvements in and Connected with Centrifugal Concentrators for Minerals, Ores, or other Dense Bodies, applicable, also, for classifying materials, of which the following is a specification.

My invention relates to improvements in centrifugal ore concentrators or classifiers, and has for its objects to provide a novel, compact, self-cleansing receiver adapted to catch and automatically deliver the materials with certainty and rapidity; to provide an unobstructed adjustable feed device; to provide a novel and efficient centrifugal distributer; to provide novel means for facilitating the rapid change of the acting parts to suit different bodies to be treated; to insure steady running and to reduce friction as much as possible of the rotary spindle, and to regulate the speed of revolution. I attain these objects by the features of construction and the combination or arrangement of devices hereinafter described and claimed, reference being made to the accompanying drawings, in which—

Figure 1:
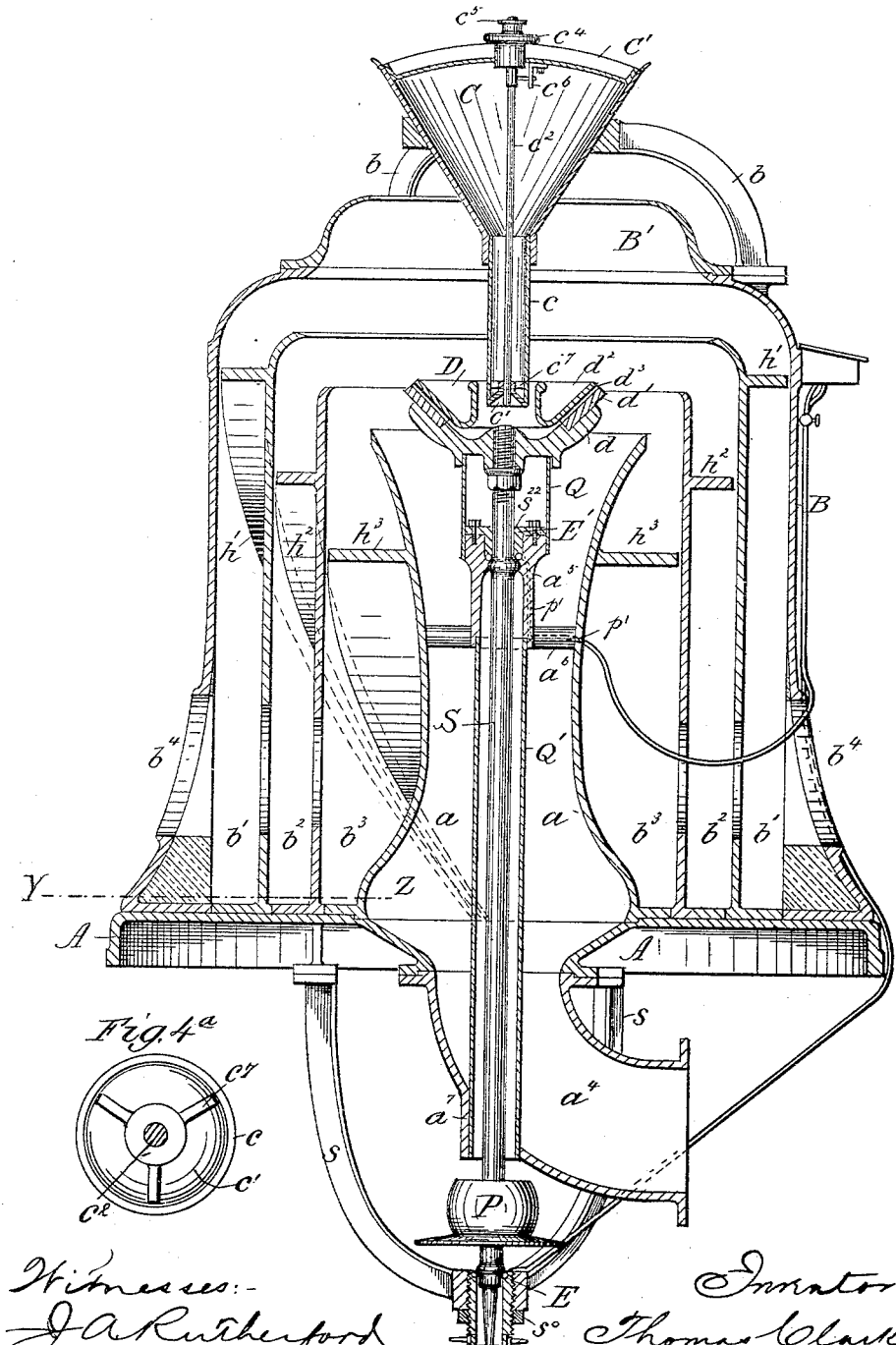
Figure 2:
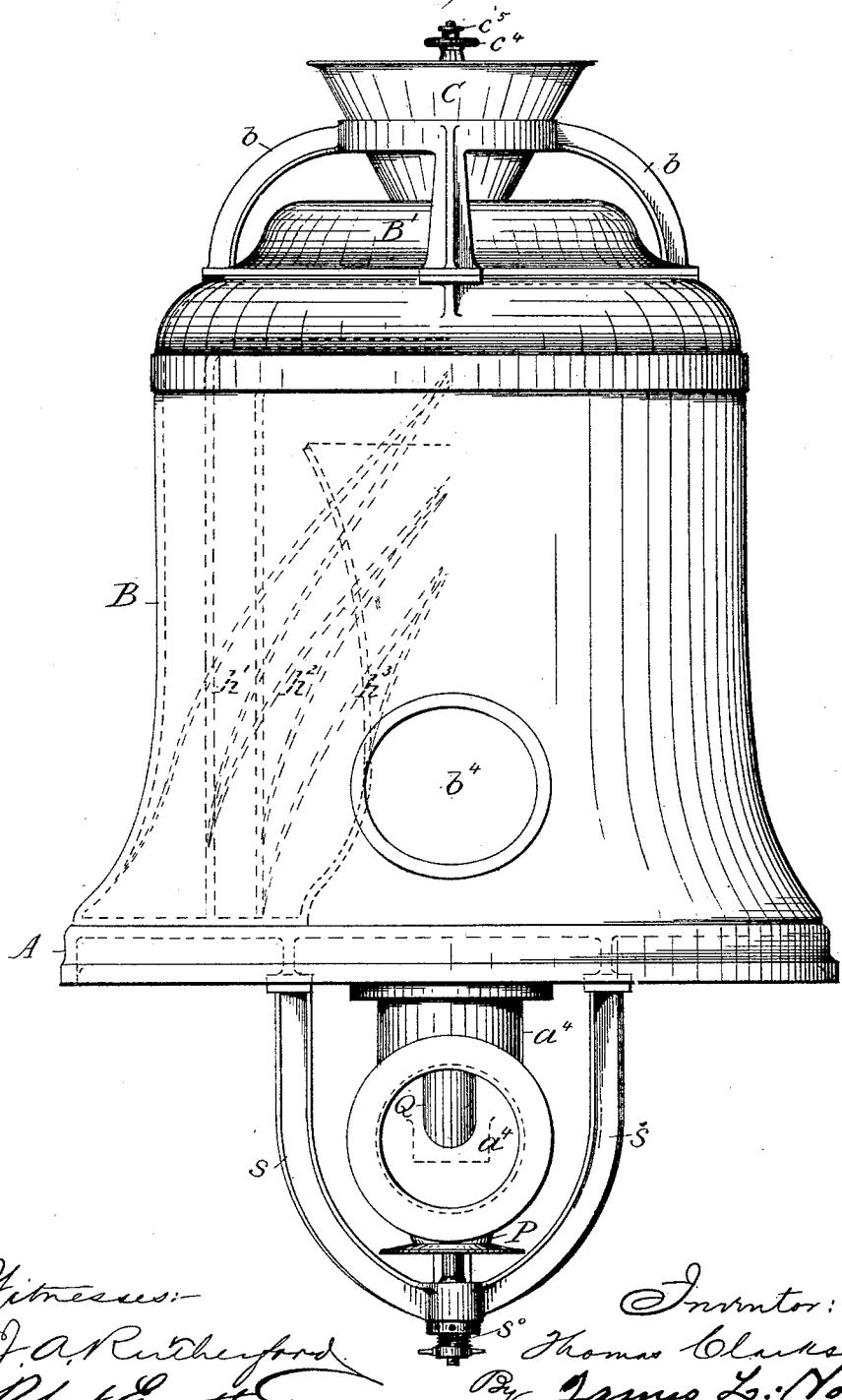
Figure 3:
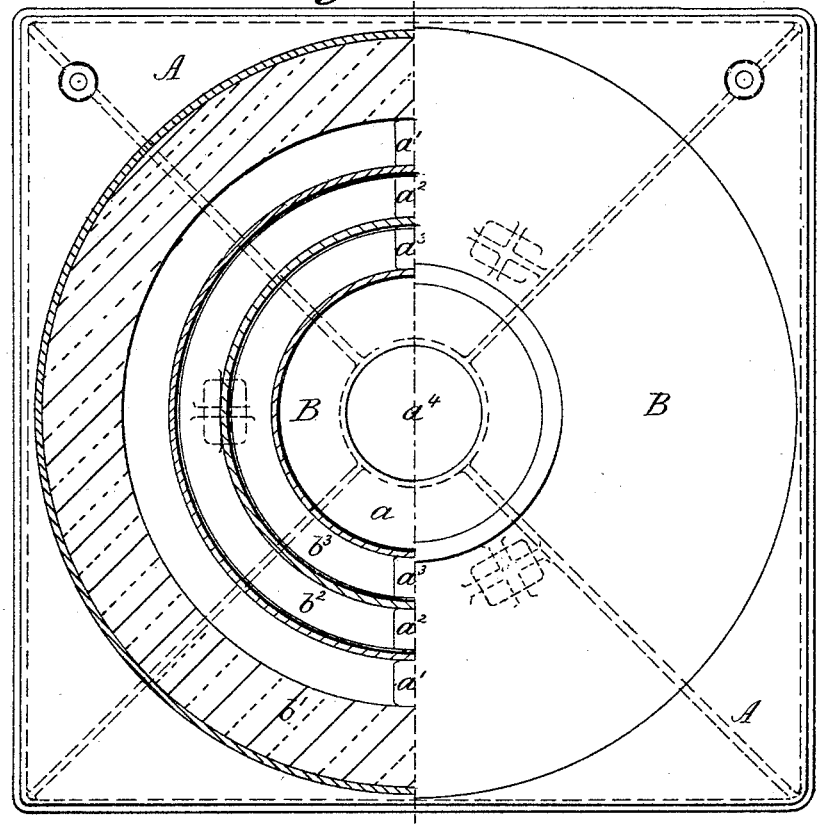
Figure 4:
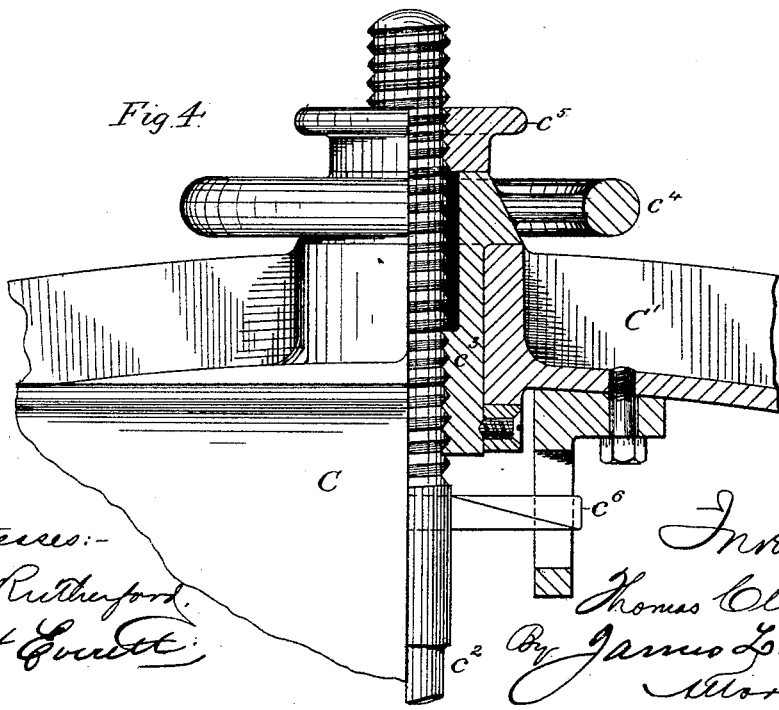
Figure 8:
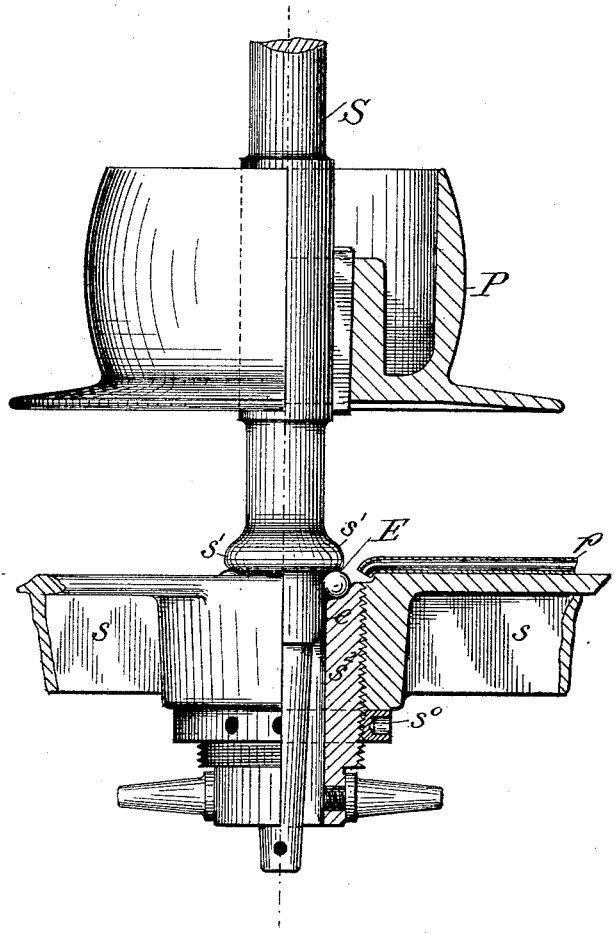
Figure 9:
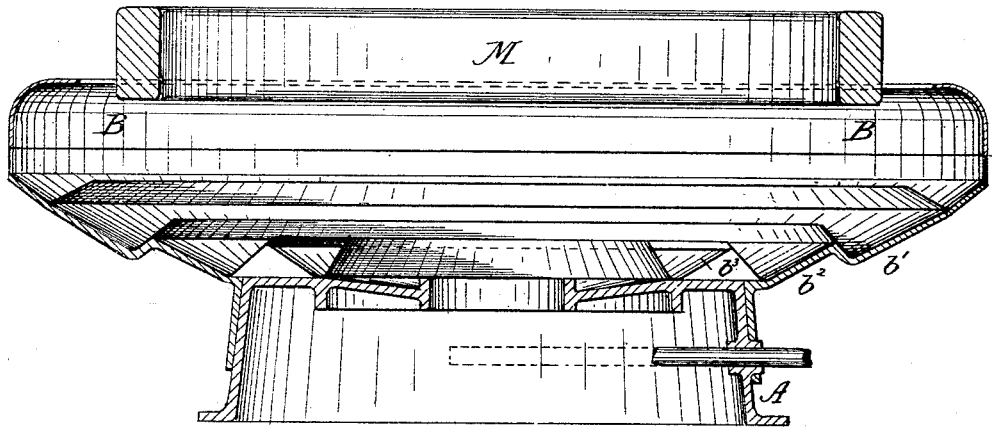
Figure 10:
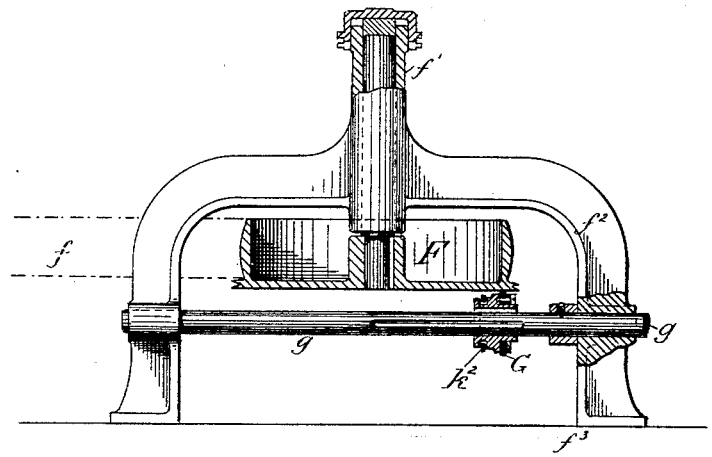
Figure 11:
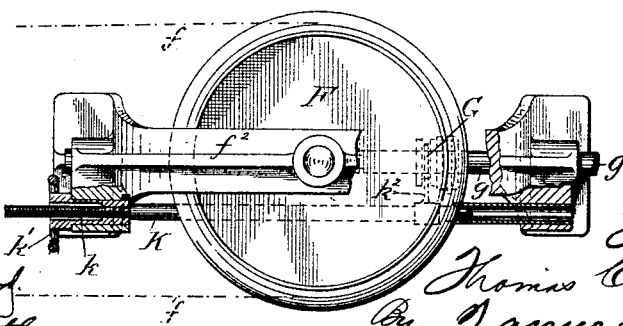

Figure 1 is a detail vertical sectional view of the machine. Fig. 2 is an elevation of the same, showing in dotted lines one half of the helical planes hereinafter explained. Fig. 3 is a half-horizontal section on line Y Z and half plan of Fig. 1; Fig. 4, a detail view of the adjusting device for the feed-hopper valve. Fig. 4$^a$ is a detail sectional view showing the winged guide-piece. Fig. 5 is half a vertical section and half an elevation of the centrifugal part or distributer, showing top bearing of driving-spindle and details of same. Fig. 6 is a part plan and section of loose rim of same. Fig. 7 is a sectional plan on line W X of Fig. 5. Fig. 8 is a sectional elevation showing details of bottom parts of driving-spindle. Fig. 9 is a sectional view of a receiver, showing the application of magnets thereto. Fig. 10 is an elevation, partly in section, of speed-regulating mechanism applied to and forming part of the ore-concentrator. Fig. 11 is an enlarged sectional plan of part of same. Figs. 12 and 13 are respectively elevations and plans showing the regulating mechanism provided with an indicating device.

Similar letters refer to similar parts throughout the several views.

The receiver B is illustrated as being of cast-iron; but it may be of any suitable material, mounted upon a bed-plate A, and divided by concentric cylinders into any required number of separate annular vertical compartments $b'$ $b^2$ $b^3$ of heights diminishing toward the innermost one, and having their upper edges turned in slightly and feather-edged to facilitate entry of material and to avoid the deflection of materials into wrong compartments. Each of these cylinders is provided with a sloping or inclined flange forming the bottoms of the compartments in the form of one or two sets of helical or spiral planes or paths, as indicated in Figs. 1 and 2, which represent the application of two sets by dotted lines at $h'$ $h^2$ $h^3$, and the apices are at levels falling toward the inner compartments. The paths lead, respectively, to the discharge-apertures $a'$ $a^2$ $a^3$, Fig. 3, in bed-plate A. These paths render the compartments self-clearing and requiring no brushes or auxiliary clearing devices, and they also serve as distance-pieces between the cylinders. $b^4$ $b^4$ are hand-holes which facilitate the making of the joints between the cylinders.

Centrally on the receiver B is fixed the chamber $a$, terminating below the top of the next outer compartment $b^3$, and its base is connected to an air-pipe $a^4$ from a fan or other exhausting device. The receiver B is surrounded by an open-topped movable cap B', which may be in separate segments and which is intended to shield the interior of the machine from extraneous drafts. Upon this cap B', by a tripod $b$ $b$, the feed-hopper C is supported, as shown in Figs. 1, 2, and 4. From it depends the feed-pipe $c$, in the foot of which is arranged a conical feed-valve $c'$. This valve is vertically adjustable by the central screwed spindle $c^2$, working in screwed bush $c^3$ in the cross-bar C', Fig. 4. The spindle is provided with hand-wheel $c^4$ and lock-nut $c^5$ and prevented from rotating during its vertical travel by the device illustrated at $c^6$.

The valve $c'$ is maintained in a true central position by means of a three-winged guide-piece $c^7$, (shown separately in Fig. 4ª,) and thus an unobstructed annular feed-opening is secured, the area of which can be adjusted as required.

At a short distance below the feed-valve $c$ and about level with the top of the chamber $a$ is fixed the distributer D. (See Figs. 1 and 5.) This is composed of three separate parts—viz., a solid base $d$, which may be of cast-iron, a loose rim $d'$, and a loose cap $d^2$. The base $d$ is fixed to the top of driving-spindle S. It is cup-shaped and of the internal form illustrated—viz., convex centrally and concaved concentrically. This curved form is for the purpose of gradually guiding the material delivered from the feed-valve $c'$ to entrance of the apertures $d^3$. It is rabbeted circumferentially to receive the rim $d'$, which is shown flared upward and outward. It fits the base $d$ exactly, so as to require no fixing thereto, and its upper surface has long narrow radial but parallel-sided channels or grooves $d^3 d^3$, as in Fig. 6, for the passage of the materials. The raised parts or walls between said grooves are beveled to a feather-edge or rounded at their inner ends.

A set of the rims $d'$ may form part of each machine, each rim having channels of different sections—say one-eighth, three thirty-seconds, one-sixteenth, and three sixty-fourths of an inch square, respectively. The drawings show the rim and its grooves flared upward at an outward angle of about forty-five degrees; but it may be horizontal or at any required angle, either at, above, or below the horizontal plane, and the level of the distributer in regard to the top of the receiving-compartments is accordingly adjusted. Upon this channeled rim $d'$ rests freely the loose cap $d^2$, the base of which forms the top of the channels $d^3$ and the inner part of which fits concentrically around but does not touch the feed-pipe $c$, and is made of the curved form shown, so as to guide the material from the pipe $c$ to the channels $d^3$, and its outer part is made to correspond exactly with the angle or lay of the ring $d'$, upon which it rests by gravity alone. When a horizontal rim $d'$ is used, the cap $d^2$ is made to overlap its periphery, and the channels $d^3$ are cut through the overlap, which may also be secured by studs and slots arranged so as not to obstruct any channel. Upon rotation the three parts $d$ $d'$ $d^2$ revolve by friction alone (or assisted by the studs) as if in one piece. The rim $d'$ and cap $d^2$ may advantageously be of hard gun-metal, brass, or phosphor-bronze, thereby avoiding corrosion. The foot of pipe $c$ and the valve $c'$ are preferably arranged just so far above the center of the base $d$ as to enable the rim $d'$ to be removed and changed, when required, by merely sliding the loose cap $d^2$ up the pipe $c$.

To insure steady running of the driving-spindle S with a minimum of friction, I apply ball-bearings and arrange the parts as follows: The spindle S is carried down centrally through the chamber $a$ and a boss $a^7$ on air-pipe $a^4$, as illustrated generally in Figs. 1 and 2, and it is supported near its foot by a ball-bearing E in a hanger $s$, fixed to the bed-plate A, and it is guided by a ball-bearing E', carried in a boss $a^5$, fixed by three arms $a^6$ in chamber $a$. The lower ball-bearing E consists of balls supporting the spindle S between an upper swell $s'$ and the hardened steel adjustable bearing-bush $s^2$, which is secured in the boss of hanger $s$ and locked by the nut $s^3$. This is lubricated by pipe $p$ from oil-box $p^2$, as shown. Above the bearing E the driving-pulley P is fixed and connected direct to a motor. The upper ball-bearing E' consists of balls running between a lower swell $s^2$ and the fixed steel bush $s^{22}$, fixed to boss $a^5$ and lubricated by pipe $p'$, cored out or cast in the boss and supplied with oil from a high level oil-box $p^2$, Fig. 3. Clearances $e$ $e'$ are left between the spindle S and the lower and upper steel bushes $s^2$ $s^{22}$, respectively, to obviate friction, so that the spindle S runs on and is guided exclusively by the ball-bearings constructed as specified and without any further bearings whatever.

To exclude dust and grit from the ball-bearings, protecting-tubes Q Q' are employed. The former encircles and, to facilitate inspection of the top bearing E', is capable of sliding upon the boss $a^5$, which is provided with three vertical slots $q$ and a horizontal groove $q'$. Three studs, fixed to and internally projecting from the tube Q, engage in the grooves, thus forming a bayonet-joint. When the tube is in its highest position, as shown in the drawings, it is supported by the three studs and the horizontal grooves, and the base of the part $d$ of the distributer is made to slightly overlap, as illustrated. The tube Q' simply encircles the spindle S and connects the bosses $a^5$ and $a^7$ to which it is fixed.

Finally, my invention comprises the combination, with the particular construction of ore-concentrator I have described, of a special device placed in any convenient position near the concentrator for regulating and indicating the speed of revolution of the spindle S.

Referring to Figs. 10 and 11, the concentrator is preferably mounted on an open frame A², and the driving-pulley P is connected not direct with the prime motor, but to a second pulley F by a band or belt $f$. This pulley F has a disk-face in its lower side, and is mounted on a vertical spindle $f^0$, running in a long bearing $f'$ in a frame or bracket $f^2$, fixed to bed $f^3$ and surmounted by a pressure-cap $f^4$ and lubricator $f^5$, as illustrated. The disk-pulley F is driven through a friction-roller G, mounted upon a spindle $g$, running in bearings in the frame or bracket $f^2$ and engaging the disk. The spindle $g$ is provided with a key or feather upon which the wheel G can slide, and is driven through pulley $g'$ and belt by the prime motor.

Alongside of the spindle $g$, (see Fig. 11,) mounted in long bearing bosses in bracket $f^2$, is a second spindle K, screwed at one end $k$, the screw working in bush $K^0$. It is provided with a hand-wheel $k'$ and a fork $k^2$, which engages with a groove in the boss of the friction-roller G, so that by the operation of hand-wheel $k'$ the fork $k^2$ causes roller G to slide up its spindle $g$ to and from the center of disk-pulley F. A graduated scale $k^3$ is fixed on the boss of the screwed part $k$, and a finger $k^4$ is fixed on spindle K, sliding with same above the graduated scale $k^3$, and thus the position of G on spindle $g$ may be inspected on the scale indicating the speed of the pulley F and of the machine. Thus no matter at what the speed the prime motor and spindle $g$ may run the speed of pulley F can be regulated by sliding the friction-roller G upon its shaft, as specified, and so the speed of the spindle S and the concentrator is regulated.

I am aware that centrifugal concentrators or classifiers generally are not new, and that receivers with annular troughs and clearing-brushes have been used, and I lay no claim to the general principles thereof.

What I claim is—

1. In a centrifugal ore concentrator or classifier, the combination of the feed-hopper C with feed-pipe containing vertically-adjustable conical feed-valve $e'$, spindle $c^2$, and adjusting device, and three-winged guide-piece $c^7$, all substantially as shown, for the purposes specified.

2. In a centrifugal ore concentrator or classifier, the combination of the rotary spindle S, the distributer D, composed of the circumferentially-rabbeted base $d$, secured to the spindle, the removable loose rim $d'$, arranged in the rabbeted portion of the base, rotated by frictional contact therewith and provided on its upper surface with radial parallel-sided channels $d^3$, and the loose cap $d^2$, resting on the loose rim, rotated by frictional contact therewith and constituting the top walls of the radial channels, the feed-pipe $c$, entering the central part of the loose cap, and a feed-valve $c'$, controlling the feed-pipe, substantially as described.

3. In a centrifugal ore concentrator or classifier, the combination of the rotary spindle S, the distributer D, composed of the circumferentially-rabbeted cup-shaped base $d$, secured to the spindle and centrally convex and concave concentric therewith, the loose rim $d'$, arranged in the rabbeted portion of the cup-shaped base rotated by frictional contact therewith and provided on its upper surface with radial parallel-sided channels $d^3$, and the loose cap $d^2$, resting on the loose rim, rotated by frictional contact therewith and constituting the top walls of the radial channels, the feed-pipe $c$, entering the central part of the loose cap, and the feed-valve $c'$, controlling the feed-pipe, substantially as described.

4. In a centrifugal ore concentrator or classifier, the combination of the distributer D and its driving-spindle S with ball-bearings E E', having clearances $e$ $e'$, movable pipe Q, and fixed pipe Q', all constructed and arranged substantially as and for the purpose set forth.

5. In combination, the feed-hopper C, distributer D, its spindle S, ball-bearings E E', receiver B, chamber $a$, bed-plate A, air-pipe $a^4$, and exhausting device, all disposed, constructed, and combined together as a whole machine, substantially in the manner described and illustrated.

6. In a centrifugal ore concentrator or classifier, the combination, with the main driving-spindle S, having the pulley P and distributer D, of the stationary frame $f^2$, the disk-pulley F, journaled in the stationary frame, the driving-belt $f$, connecting the disk-pulley with the pulley on the driving-spindle, the rotary spindle $g$, provided with a slidable friction-wheel G, a screw-spindle K, extending parallel to the wheel-spindle, loosely engaged with the friction-wheel and having a finger $k^4$, the hand-wheel $k'$, engaging the screw-spindle, and the scale-plate $k^3$, co-operating with the finger on the screw-spindle, substantially as described.

In testimony whereof I affix my signature in presence of two witnesses.

THOMAS CLARKSON.

Witnesses:
JOSEPH CRAWHALL CHAPMAN,
JOSEPH LAKE.